United States Patent [19]

Zuccaro et al.

[11] Patent Number: 4,793,053
[45] Date of Patent: Dec. 27, 1988

[54] QUICK DISCONNECT DEVICE

[75] Inventors: Dante C. Zuccaro, Warren; Frederick A. McCurdy, Royal Oak, both of Mich.

[73] Assignee: General Motors Corporation, Detroit, Mich.

[21] Appl. No.: 39,091

[22] Filed: Apr. 16, 1987

[51] Int. Cl.$^4$ .................. B23Q 3/155; B25B 15/04
[52] U.S. Cl. .................................. 29/568; 279/4; 279/75; 294/86.4; 403/325; 403/328; 414/729; 901/30; 901/31; 901/41
[58] Field of Search ............... 29/568; 414/730, 729; 901/30, 31, 39, 37, 41, 50; 403/325, 327, 328, DIG. 6; 409/231, 232; 279/4, 22, 30, 75; 294/82.28, 86.4, 94

[56] References Cited

U.S. PATENT DOCUMENTS

| | | | |
|---|---|---|---|
| 2,135,861 | 11/1938 | Thompson | 279/75 |
| 2,970,844 | 2/1961 | Better | 279/75 |
| 4,549,846 | 10/1985 | Torii et al. | 414/729 |
| 4,611,377 | 9/1986 | McCormick et al. | 29/407 |
| 4,624,043 | 11/1986 | Bennett | 29/568 |
| 4,635,328 | 1/1987 | Palmer | 29/568 |
| 4,636,135 | 1/1987 | Bancon | 901/37 |
| 4,652,203 | 3/1987 | Nakashima et al. | 901/30 |
| 4,679,956 | 7/1987 | Douglas et al. | 403/322 |

FOREIGN PATENT DOCUMENTS

| | | | |
|---|---|---|---|
| 3408857 | 7/1985 | Fed. Rep. of Germany | 403/DIG. 6 |
| 236281 | 6/1986 | German Democratic Rep. | 29/568 |

OTHER PUBLICATIONS

EOA Systems, Inc. Brochure, Quick Change Adaptors.
Mecanotron TM Corporation, Flat Linear Actuator Tool Change System, p. 2, 1986.
Applied Robotics Brochure for XChange Model 10, One page.
Erickson Brochure, ExCentro Lok Tooling Tree.

*Primary Examiner*—Gil Weidenfeld
*Assistant Examiner*—Daniel W. Howell
*Attorney, Agent, or Firm*—Ernest E. Helms

[57] ABSTRACT

The present invention provides a quick disconnect coupling for a work tool to a machine. The invention in its preferred embodiment provides a coupling having fluid and electrical connections and also providing alignment independent of the locking mechanism. The present invention also is advantageous in that the locking mechanism is protected from the environment when the coupling halves are not mated and also prevents a false lock-up unless the halves of the coupling are mated and aligned.

15 Claims, 3 Drawing Sheets

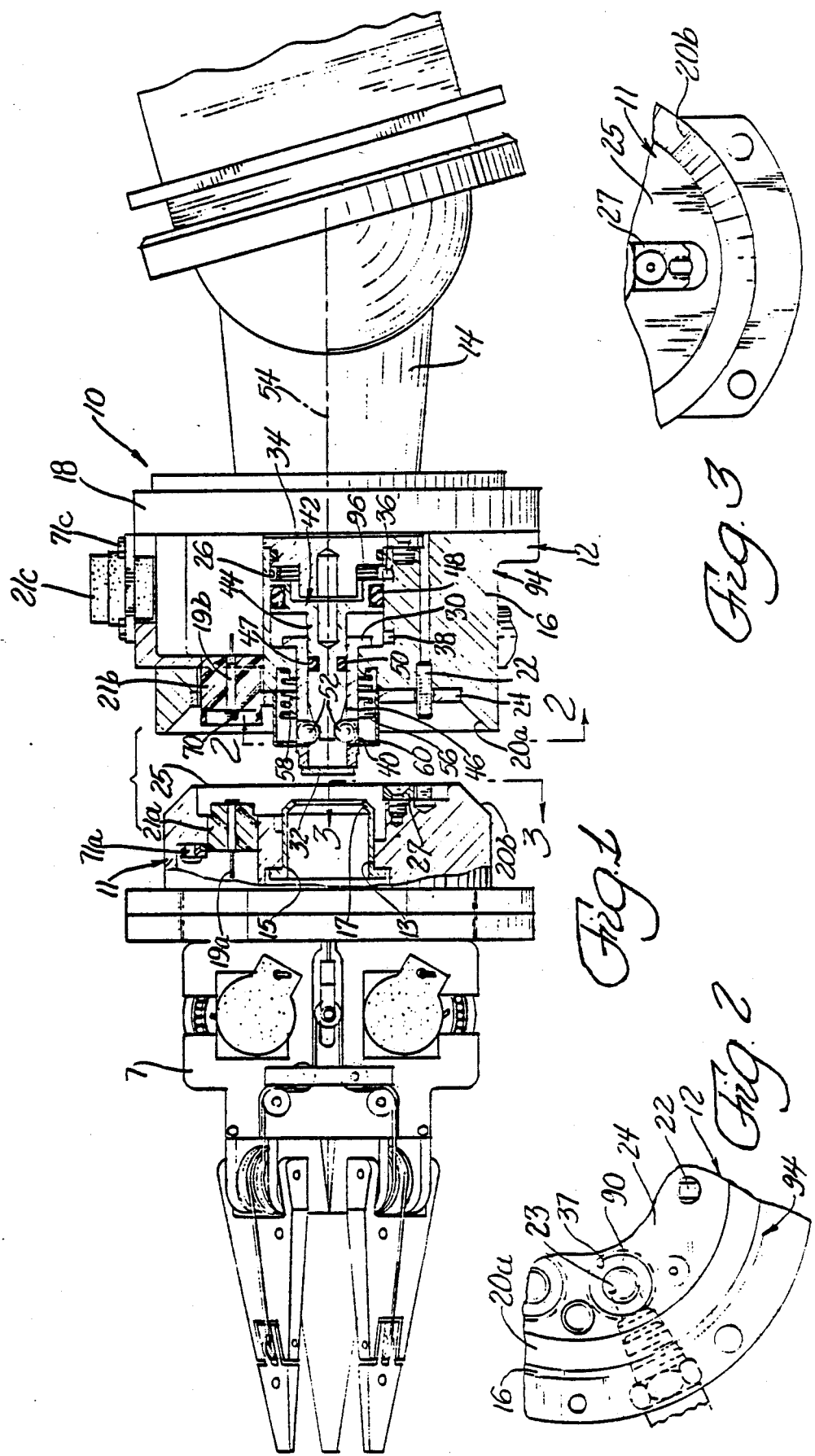

QUICK DISCONNECT DEVICE

FIELD OF THE INVENTION

This invention relates to a coupling device and more particularly concerns an apparatus and method of utilization thereof of a quick disconnect device for coupling a work tool (or end of arm tooling device EOAT) to a machine (support or robot) and providing a quick disconnect for electrical and fluid connections

DISCLOSURE STATEMENT

This application is an improvement to the quick disconnect device disclosed in Douglas et al. U.S. Pat. No. 4,679,956 commonly It is known in the art to provide quick disconnect devices for coupling a work tool to a machine wherein the coupling (or locking mechanism is independent of the portions of the coupling which provide alignment. It is a desire of the present invention to provide a quick disconnect coupling as described in the above-noted application which provides a more simplified construction and also protects the coupling mechanism from the environment.

Protection of the coupling mechanism from the environment is helpful since the coupling mechanism can sometimes be contaminated with particles from the environment such as dirt or metal shavings. Also it is desirable to protect the coupling mechanism from possible exposure to chemicals which over a passage of time can sometimes accumulate within the coupling mechanism or possibly have a corrosive effect. Another desire of the present invention is to provide a quick disconnect coupling which can not couple together unless the coupling halves are properly mated and aligned. Therefore, some means must be provided to prevent the coupling from being falsely activated to lock the coupling halves together when the coupling halves are not mated and properly aligned.

SUMMARY OF THE INVENTION

To meet the above-noted and other desires the present invention is brought forth. The present invention is a work-tool to work-station coupling device wherein alignment is independent of the coupling mechanism. The coupling mechanism has a closure which protects the coupling mechanism from the environment when the coupling halves are separated. The closure also functions to prevent operation of the coupling mechanism when the coupling halves are not aligned or mated.

It is an object of the present invention to provide an apparatus and method of utilization thereof of a quick disconnect coupling for a work station and a work tool.

It is also an object of the present invention to provide a quick disconnect coupling for connecting a tool to machine, including a tool adapter for holding the tool having a generally axial central cavity, and at least one generally axially orientated member bordering the central cavity and projecting towards the machine, and a tool changer adapted for sequentially mating and coupling with the tool adapter and connected with the machine, the tool changer including a shell with a generally axial interior chamber, a first passage fluidly connecting the outside of the shell and the interior chamber, and the interior chamber shell having at least one generally radial aperture intersecting the chamber axially separated from the first passage and towards the tool adapter, a piston slidably mounted in the interior chamber and responsive to a fluid fed into the interior chamber from the first passage, the piston having a rod portion with a cam portion adjacent the radial aperture, a locking member movably mounted within the radial aperture for interacting with the cam portion of the rod and the axially orientated member to couple the tool changer with the tool adapter, and closure means biased to a first position whereby the radial aperture is closed when the tool changer and the tool adapter are not mated and whereby the closure means is moved to a second position by the axially orientated member to open the radial aperture when the tool changer and the tool adapter are mated, the opening of the aperture allowing the piston to move to a position to cause the locking member to be captured between the cam portion of the rod and the axially orientated member to couple the tool changer with the tool adapter.

It is also an object of the present invention to provide a quick disconnect coupling for coupling an EOAT to a robot, the coupling including a tool adapter connected with the EOAT having a generally axial central cavity, and a generally tubular axially orientated member bordering the central cavity projecting towards the robot having an interior flange at its end toward the robot and the tool adapter having a frusto conical surface on its end toward the robot, and a tool changer adapted for sequentially mating and coupling with the tool adapter along a frusto conical surface complementary to the tool adapter frusto conical surface and for connection with the robot, the tool changer including a cylindrical shell with a generally axial cylindrical interior chamber with an axial center line, a first and second passage connecting the outside of the shell and the interior chamber and the interior chamber having a plurality of generally radial apertures intersecting the chamber axially separated from the first passage and towards the tool adapter, a piston slidably mounted in the interior chamber dividing the interior chamber between the first and second passages and responsive to a fluid fed into the interior chamber from the first or second passages, the piston having an attached rod with a cammed portion having a 7° cam angle with a line parallel with the axial center line of the interior chamber and the cam portion being adjacent to the radial apertures; a locking ball movably mounted within each of the radial apertures for interacting with the cam portion of the rod and the flange of the axially orientated cylinder to couple the tool changer with the tool adapter, and closure means including a fixed annular cover surrounding the interior chamber and a spring biased ring biased to a first position whereby the radial apertures are closed when the tool changer and the tool adapter are not mated and the spring biased ring being moved to a second position whereby the radial apertures are open by the axially orientated member when the tool changer and the tool adapter are mated, the opening of the aperture allowing the locking balls to be captured between the cam portion of the rod and the interior flange of the axially orientated member to couple the tool changer with the tool adapter.

It is yet still another object of the present invention to provide a method of sequentially mating and coupling an EOAT connected with a tool adapter having a generally axial central cavity and at least one generally axially orientated member bordering the central cavity and projecting away from the EOAT, to a robot having a connected tool changer which includes a shell with a generally axial interior chamber including a first passage fluidly connecting the outside of the shell with the interior chamber, at least one generally radial aperture intersecting the interior chamber axially separated from the first passage and towards the tool adapter, a piston slidably mounted in the interior chamber and responsive to a fluid fed into the interior chamber from the first passage, the piston having an attached rod with a cam portion adjacent the radial aperture, a locking member movably mounted within the radial aperture for interacting with the cam portion of the rod and the axially orientated member to couple the tool adapter with the tool connector, closure means biased to a first position whereby the radial aperture is closed when the tool changer and the tool adapter are not mated and whereby the closure means is moved by the axial oriented member to a second position opening the radial aperture when the tool changer and the tool adapter are mated the opening of the aperture allowing the piston to move to a position causing the locking member to be captured between the cam portion of the rod and the axially orientated member to couple the tool changer with the tool adapter, the method including mating the tool adapter with the tool changer and aligning the tool adapter with the tool changer, contacting the axially orientated member of the tool adapter with the closure means of the tool changer to open the radial aperture, fluidly communicating the interior passage with the outside of the shell of the tool changer to move the piston, interacting the cam portion of the piston with the locking member whereby the locking member is forced outward contacting the axially orientated member of the tool adapter to couple the tool adapter with the tool changer.

Other objects, desires and advantages of the present invention will become more apparent to those skilled in the art as the nature of the invention is better understood from the accompanying drawings and a detailed description.

BRIEF DESCRIPTION OF THE DRAWINGS

FIG. 1 is a sectional view with portions in front elevation of a preferred embodiment coupling of the present invention with the tool adapter coupling halve (connected with an EOAT) separated from a tool changer coupling half (connected with a robot);

FIGS. 2 and 3 are views taken along lines 2—2 and 3—3 of FIG. 1, respectively.

DETAILED DESCRIPTION OF THE DRAWINGS

Figure 4:
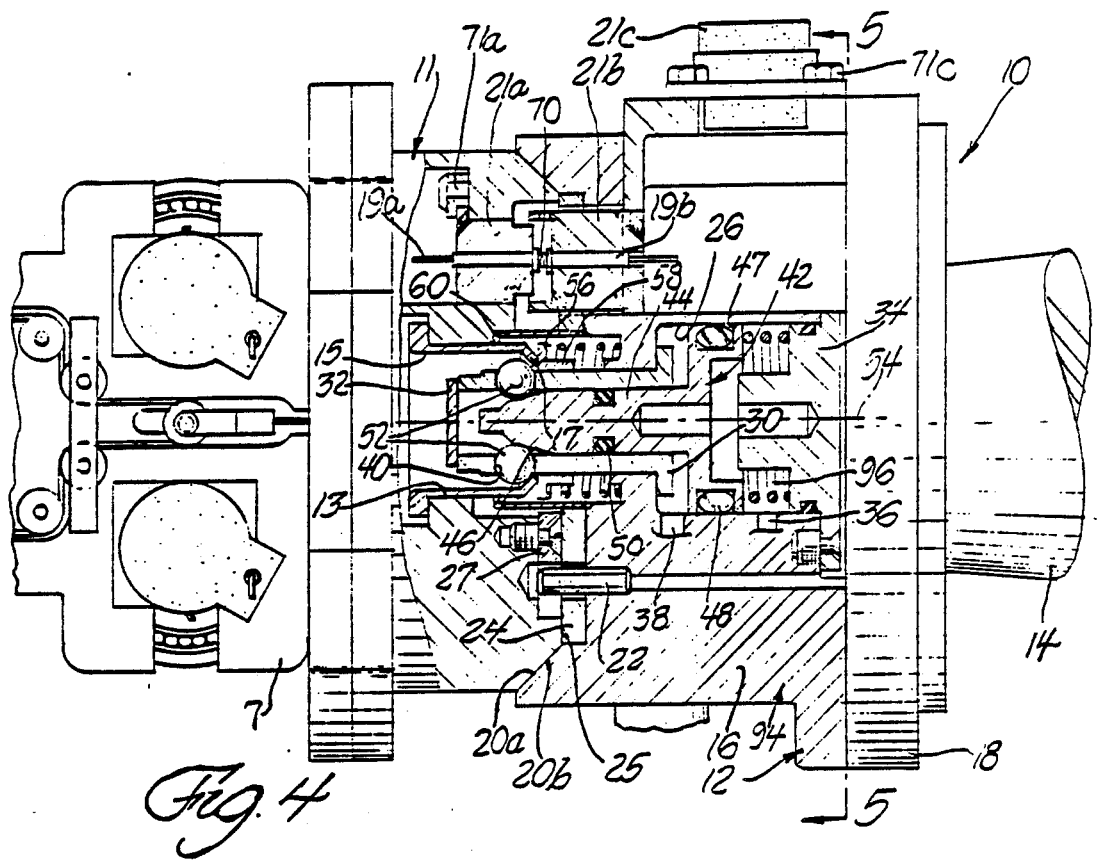
FIG. 4 is a sectional view with portions in front elevation illustrating the tool adapter and the tool changer halves of the coupling mated and coupled together.
Figure 5:
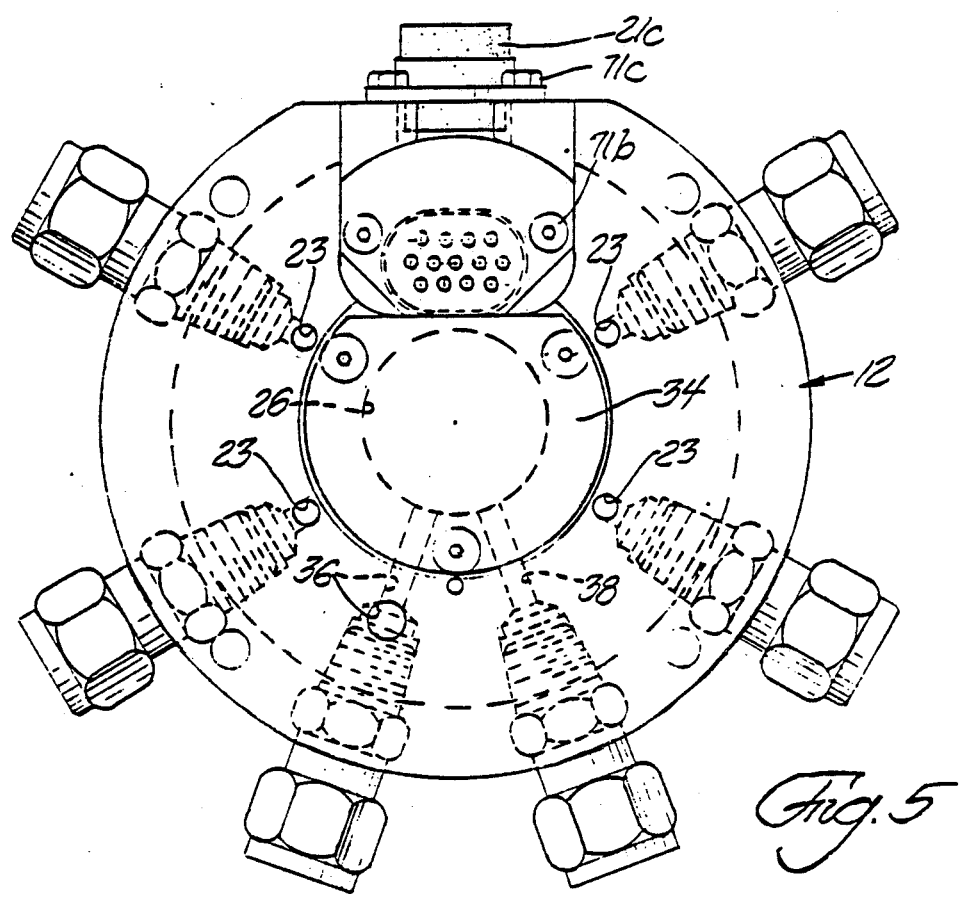
FIG. 5 is a view taken along line 5—5 of FIG. 4.

Referring to FIG. 1 an EOAT 7 has connected thereto the female portion of the quick disconnect coupling 10 of the present invention commonly referred to as the tool adapter 11. Connected with the robot 14 is the male portion of the coupling commonly referred to as the tool changer 12. The tool changer is adapted for sequentially mating and coupling with the tool adapter 11. Referring additionally to FIGS. 2, 3, 4 and 5, the tool adapter 11 is connected with the EOAT 7 and provides fluid and electrical connections for the EOAT 7. The end of the tool adapter 11 towards the robot 14 (opposite the EOAT 7) has a cylindrical axial central cavity 13. The tool adapter 11 also has at least one generally axially orientated member 15 bordering the central cavity 13. As shown in FIGS. 1 and 2, axially oriented member 15 is tubular shaped having an inward facing flange 17. The tool adapter has a frusto conical surface 20b that surrounds and is radially spaced from the axially orientated member 15.

The tool adapter 11 also has an electrical cable or lines 19a and connector 21a. The electrical connector 21b illustrated provides thirteen lines 19b (commonly referred to as leads) with spring loaded contacts 70. Connectors 21a, b and c are also made to be removable by removal of fasteners 71a, b and c for substitution of an electrical connector with a different amount of lines.

For noncomingled fluidic coupling of air or hydraulic feeds, fluid lines 2 are provided. Fluid lines 23 intersect surface 25 of the tool adapter 11. Hardened plate 24 has apertures 37 with inserted O-rings 90 (FIG. 2) to mate and seal fluid line 23 as it extends into the tool changer 12.

The tool changer 12 has a cylindrical shell 94 which includes a cylinder 16 and a back plate 18. The tool changer 12 has a frusto conical surface 20a that is complementary to the frusto conical surface 20b on the tool adapter 11. The tool changer 12 also is provided for rough alignment an axial locating pin 22. Locator plate 27 (FIG. 3) fixably connected with tool adapter 11 is provided to encircle locating pin 22. The tool changer 12 has a generally axial interior chamber 26 formed by cylinder 16 and inner shell member 30, cap 32 and plug 34.

Intersecting the interior chamber are first 36 and second 38 fluid passages usually provided for a pneumatic air control system. The interior chamber 26 also has axially separated from the first 36 and second 38 passages, on an end of the tool changer away from the robot 14 (towards the tool adapter 11) a plurality of generally radial apertures 40 usually equally geometrically spaced. Slidably mounted within the interior chamber is a piston 42. The piston 42 has fixably attached thereto a rod 44 with an inclined cam portion 46. If desired, the piston 42 can be spring biased by a spring 96 captured between plug 34 and the piston 42. The piston 42 also has an O-ring 48 within an annular groove 47 of the piston which divides the interior chamber 26 into separate sealed sections. The piston rod 44 also has a second annular chamber with an O-ring 50 which fluidly isolates the apertures 40 from the remainder of the interior chamber 26. Movably mounted within each radial aperture 40 is a locking member, typically a ball 52 to couple the tool changer 12 with the tool adapter 11. The piston has an actuated (FIG. 4) and a nonactuated (FIG. 1) position. In the nonactuated position, the piston 42 is in a generally retracted position and the balls 52 are allowed to move inwardly. In the extended coupling position, the cam portion 46 of the piston rod 44 interacts with the balls 52 at a cam angle between 5° and 9° as illustrated in FIG. 4 the cam portion 4b is at a 7° cam angle. The cam angle can be defined as the angle between a line tangent to cam portion 46 and a line parallel to the axial center line 54 of the interior chamber 26. The interaction of the cam portion 46 of the piston rod 44 with the balls 52 causes the balls 52 to be captured, between the cam portion 46 and the flange 17 of the axially orientated member 15 coupling the tool changer 12 with the tool adapter 11.

When the tool changer 12 and the tool adapter 11 are uncoupled, the apertures 40 are covered by a closure means 56 L-shaped ring 58 which is spring biased. The L-shaped ring 58 in the uncoupled position mates with a fixed annular cover 60, which surrounds the interior chamber 26 to seal apertures 40 from the environment. (Note in FIG. 1 the L-shaped ring 58 is shown in a pushed back position for clarity of illustration. However the L-shaped ring 58 would normally cover aperture 40 when the tool changer 12 is uncoupled from the tool adapter.)

It has usually been found that after coupling of the tool changer 12 with the tool adapter 11 the 7° cam angle allows the coupling halves to be held together even when air pressure is not available from the passage 36. The force exerted by spring 96 further ensures that the coupling halves are held together. A 7° cam angle will cause the uncoupling force to be approximately eight (8) times greater than the force exerted on piston 42 by the differential fluid pressure of the first 36 and second 38 passages (compensated by the differential areas of piston 42 by virtue of rod 44) and by the force exerted by the spring 96.

To couple the tool adapter with the tool changer 12 the axially elongated member 15 first pushes the closure L-shaped ring 58 downward. The above action opens apertures 40, allowing the balls 52 to be pushed outward by the cam portion 46 of the piston rod 44. Therefore, whenever there is not proper alignment between the coupling halves, the axially elongated member 15 can not push down the L-shaped ring 58 and the piston rod 44 will not be allowed to move to an activated position allowing the coupling halves to couple together. The above described feature prevents false coupling of the parts when alignment is not proper even when air pressure is present in first passage 36 since closures 40 are closed by L-shaped ring 58, preventing the outward movement of balls 52. To uncouple the coupling halves, pressurized air is connected with second passage 38, thereby retracting piston rod 44 against spring 96 and allowing balls 52 to move radially inward, thereby releasing axially elongated member 15. The tool adapter 11 is now released and can be removed.

Figure 6:
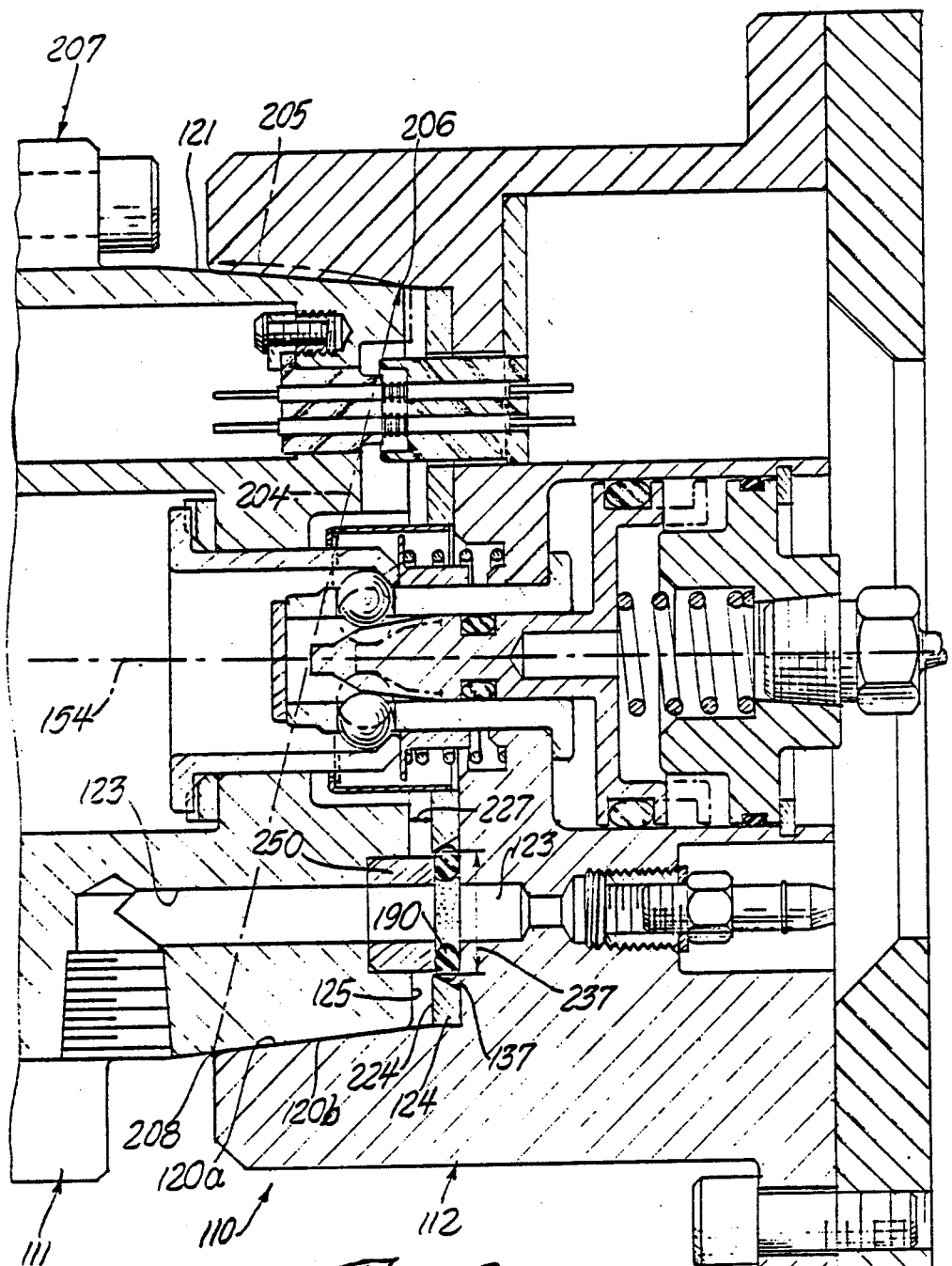
FIG. 6 is a sectional view of an alternative preferred embodiment of the present invention.

FIG. 6 is an alternate embodiment coupling 110 with parts similar to those illustrated in FIGS. 1-4 having the same referenced numerals prefixed by a 1. Line 123 is sealed by a concentric O-ring 190 captured in a tapered aperture 37 of hardened plate 124. A bushing 250 concentric with the O-ring 190 and connected with tool adapter 111 is provided for mating and sealing with the O-ring 190.

The bushing 250 has a diameter smaller than the minor diameter 237 of aperture 137. One advantage offered by this design is that there is a gap 227 between surface 125 and the top surface 224 of plate 124. The gap allows room for dirt or other particles and prevents the particles from interfering with the sealing of line 23 or interfering with the mating of tool adapter 111 with tool changer 112.

If surface 125 was used to mate and seal with O-ring 190 the compression of O-ring 190 would be limited to the cross sectional diameter of 0-ring 190 minus the thickness of plate 124. However, bushing 250 with a diameter less than the minor diameter 237 of aperture 137 can now further compress 0-ring 190 below the level of the top surface 224 of plate 124. The above configuration allows bushing 250 to further compress O-ring 190 to a thickness less than that of plate 124 providing better sealing.

Since surface 125 no longer has to be flush with surface 224 (to compress 0-ring 190) the taper of frusto conical surfaces 120a and 120b can now be formed near a 6° instead of a 45° angle (with axial center line 154). The 45° angle was provided to assure the flush contact between surface 125 and plate 124 when the diameter of the tool adapter conical surface 120b was towards the upper end of its dimensional tolerance. Now by virtue of the 6° taper if the tool adapter 111 is mated and coupled with the tool changer 112, the tool adapter 111 will not be permitted to separate from the tool changer 112 without relative axial movement between the tool adapter 111 and the tool changer 112 or deformation of one of the frusto conical surfaces 120a or 120b. To illustrate the above a diametrically bisecting line 204 is drawn between a point of outermost contact 208 of frusto conical surfaces 120a and 120b and a point of innermost contact 206 of frusto conical surfaces 120a and 120b. Moment force 205 influences tool adapter 111. Point 206 on surface frusto conical surface 120b will have to take the path of arc 205 if the tool adapter 111 and tool changer remain fixed at point 208. Therefore deformation of tool changer 112 frusto conical surface 120a must occur. Since separation cannot occur under the influence of moment forces without deformation, the coupling 110 is more prone to fail under an axial load. The above failure mode is desirable because of the previously explained approximately 8:1 axial force advantage of the coupling.

It is an object of the present invention to provide a method of sequentially mating and coupling a tool 7 connected with a tool adapter 11 having a generally axial central cavity 13 and at least one generally axially orientated member 15 bordering the central cavity 13 and projecting away from the tool 11, to a machine 14 having a connected tool changer 12 which includes a shell 94 with a generally axial interior chamber 26 including a first passage 36 fluidly connecting the outside of the shell 94 with the interior chamber 26, at least one generally radial aperture 40 intersecting the interior chamber axially separated from the first passage 36 and towards the tool adapter 11, a piston 42 slidably mounted in the interior chamber and responsive to a fluid fed into the interior chamber from the first passage 36, the piston having an attached rod 44 with a cam portion 46 adjacent the radial aperture 40, a locking member 52 movably mounted within the radial aperture 40 for interacting with the cam portion 46 of the rod 44 and the axially orientated member 15 to couple the tool adapter 11 with the tool connector 12, closure means 56 biased to a first position whereby the radial aperture 40 is closed when the tool changer 12 and the tool adapter 11 are not mated and whereby the closure means 56 is moved by the axially oriented member 15 to a second position opening the radial aperture 40 when the tool changer 12 and the tool adapter 11 are mated the opening of the aperture 40 allowing the piston 44 to move to a position causing the locking member 52 to be captured between the cam portion 46 of the rod 44 and the axially orientated member 15 to couple the tool changer 12 with the tool adapter 11, the method including the following steps:

1. Mating the tool adapter 11 with the tool changer 12 and aligning the tool adapter 11 with the tool changer 12;

2. Contacting the axially orientated member 15 of the tool adapter 11 with the closure means 56 of the tool changer 12 to open the radial aperture 40;

3. Fluidly communicating the interior passage 36 with the outside of the shell 94 of the tool changer 12 to move the piston 42;

4 Interacting the cam portion 46 of the piston with the locking member 52 whereby the locking member 52 is forced outward contacting the axially orientated member 15 of the tool adapter 11 to couple the tool adapter with the tool changer 12.

While an embodiment of the present invention has been explained it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A quick disconnect coupling for connecting a tool to machine, said coupling in combination comprising:
    a tool adapter for holding said tool having a generally axial central cavity, and at least one generally axially orientated tubular member bordering said central cavity and projecting towards said machine and said tool adapter having a frusto conical surface surrounding and radially spaced from said generally axially orientated member; and
    a tool changer adapted for sequentially mating and coupling with said tool adapter and connected with said machine, said tool changer including:
    a shell with a generally axial interior chamber and with a frusto conical surface along a common axial center line with said tool adapter frusto conical surface for mating therewith;
    a first passage fluidly connecting the outside of said shell and said interior chamber, and said interior chamber having at least one generally radial aperture intersecting said chamber axially separated from said first passage and towards said tool adapter;
    a piston slidably mounted in said interior chamber and responsive to a fluid fed into said interior chamber from said first passage said piston having a rod portion with a cam portion adjacent said radial aperture;
    a locking member movably mounted within said radial aperture for interacting with said cam portion of said rod and said axially orientated member to radially push said cam member outward to couple said tool changer with said tool adapter; and
    closure means biased to a first position whereby said radial aperture is surrounded and closed when said tool changer and said tool adapter are not mated and whereby said closure means is moved to a second position by said axially orientated member to open said radial aperture when said tool changer and said tool adapter are mated, the opening of said aperture allowing said piston to move to a position to cause said locking member to be captured between said cam portion of said rod and said axially orientated member to couple said tool changer with said tool adapter.

2. A coupling as described in claim 1 wherein said tool changer is connected to a robot and said tool adapter is connected to an EOAT.

3. A coupling as described in claim 1 wherein said tool changer also includes a spring biasing said piston.

4. A coupling as described in claim 1 wherein said cam portion has a cam angle between 9° and 5° with said common axial center line.

5. A coupling as described in claim 1 wherein said tool adapter has a plurality of generally radial apertures, each said aperture having a locking member.

6. A coupling as described in claim 1 wherein said closure means includes a spring biased ring surrounding said interior chamber mating with a fixed annular cover to provide a closed annular chamber to seal off said apertures of said interior chamber.

7. A coupling as described in claim 1 further including a fluid connector for fluidly connecting a line from said tool changer to said tool adapter.

8. A coupling as described in claim 7 wherein said fluid connector includes one of said tool adapter or tool changer having a plate with a tapered aperture and a minor diameter, said plate tapered aperture capturing an O-ring concentric with said line, and said other tool changer or adapter having a bushing concentric with said O-ring with a diameter less than said minor diameter of said aperture of said plate for mating and sealing with said O-ring to seal said line.

9. A coupling as described in claim 8 wherein said plate has a first thickness and said O-ring is compressed to a thickness less than said plate by said bushing when said tool adapter is mated and coupled with said tool changer.

10. A coupling as described in claim 8 wherein said tool changer has said plate with said tapered aperture.

11. A coupling as described in claim 1 wherein said taper of said frusto conical surfaces will not permit said tool adapter when mated and coupled with said tool changer to separate from said tool changer under the influence of moment forces without axial movement between said tool adapter and said tool changer or deformation of said frusto conical surfaces.

12. A coupling as described in claim 1 further including an electrical connector for connecting an electrical line from said tool changer to said tool adapter.

13. A quick disconnect coupling for coupling an EOAT to a robot, said coupling in combination comprising:
    a tool adapter connected with said EOAT having a generally axial central cavity, and a generally tubular axially orientated member bordering said central cavity projecting towards said robot having an interior flange at its end toward said robot and said tool adapter having a frusto conical surface on its end toward said robot said frusto conical surface surrounding and being radially spaced from said axially orientated member; and
    a tool changer adapted for sequentially mating and coupling with said tool adapter along a frusto conical surface complementary to said tool adapter frusto conical surface and for connection with said robot, said tool changer including:
    a cylindrical shell with a generally axial cylindrical interior chamber with an axial center line;
    a first and second passage connecting the outside of said shell and said interior chamber and said interior chamber having a plurality of generally radial apertures intersecting said chamber axially separated from said first passage and towards said tool adapter;

a piston slidably mounted in said interior chamber dividing said interior chamber between said first and second passages and responsive to a fluid fed into said interior chamber from said first or second passages, said piston having an attached rod with a cammed portion having a 7° cam angle with a line parallel with the axial center line of said interior chamber and said cam portion being adjacent to said radial apertures;

a locking ball movably mounted within each of said radial apertures for interacting with said cam portion of said rod and said flange of said axially oriented cylinder to couple said tool changer with said tool adapter; and closure means including a fixed annular cover surrounding said interior chamber and a spring biased ring biased to a first position whereby said radial apertures are closed when said tool changer and said tool adapter are not mated and said spring biased ring being moved to a second position whereby said radial apertures are open by said axially orientated member when said tool changer and said tool adapter are mated, the opening of said aperture allowing said locking balls to captured between said cam portion of said rod and said interior flange of said axially orientated member to couple said tool changer with said tool adapter.

14. A method of sequentially mating and coupling a tool connected with a tool adapter having a generally axial central cavity and at least one generally axially orientated member bordering said central cavity and projecting away from said tool and a frusto conical surface surrounding and radially spaced from said axially orientated member, to a machine having a connected tool changer which includes a shell with a frusto conical surface complementary to said frusto conical surface of said tool adapter for mating therewith and said shell having a generally axial interior chamber including a first passage fluidly connecting the outside of said shell with said interior chamber, at least one generally radial aperture intersecting said interior chamber axially separated from said first passage and towards said tool adapter, a piston slidably mounted in said interior chamber and responsive to a fluid fed into said interior chamber from said first passage, said piston having an attached rod with a cam portion adjacent said radial aperture, a locking member movably mounted within said radial aperture for interacting with said cam portion of said rod and said axially orientated member to couple said tool adapter with said tool connector, closure means biased to a first position whereby said radial aperture is closed when said tool changer and said tool adapter are not mated and whereby said closure means is moved by said axially orientated member to a second position opening said radial aperture when said cool changer and said tool adapter are mated the opening of said aperture allowing said piston to move to a position causing said locking member to be captured between said cam portion of said tool changer with said tool adapter, said method in combination comprising:

mating said tool adapter with said tool changer and aligning said tool adapter with said tool changer along said frusto conical surfaces;

contacting said axially oriented member of said tool adapted with said closure means of said tool changer to pen said radial aperture;

fluidly communicating said interior passage with said outside of said shell of said tool changer to move said piston;

interacting said cam portion of said piston with said locking member whereby said locking member is forced outward contacting said axially orientated member of said tool adapter to couple said tool adapter with said tool changer.

15. A coupling as described in claim 7 further including a second fluid connector for fluidly connecting a second noncomingling line from said tool changer to said tool adapter.

* * * * *